(12) United States Patent
Hebblewhite et al.

(10) Patent No.: US 6,171,127 B1
(45) Date of Patent: Jan. 9, 2001

(54) HOLDER FOR A PORTABLE ELECTRONIC DEVICE

(75) Inventors: Malcolm R. Hebblewhite; Andrew J. Gartrell; Isaac Ward, all of New South Wales (AU)

(73) Assignee: Nokia Mobile Phones Limited, Espoo (FI)

( * ) Notice: Under 35 U.S.C. 154(b), the term of this patent shall be extended for 0 days.

(21) Appl. No.: 09/268,932

(22) Filed: Mar. 16, 1999

(30) Foreign Application Priority Data

Mar. 18, 1998 (GB) .................................................. 9805711

(51) Int. Cl.[7] .......................... H01R 13/625; H01R 9/22; H01R 13/73
(52) U.S. Cl. ............................................. 439/341; 439/929
(58) Field of Search ................................... 439/341, 929, 439/500, 138; 320/2; 379/446, 755; 361/732; 360/96.6

(56) References Cited

U.S. PATENT DOCUMENTS

| | | |
|---|---|---|
| 4,957,264 | 9/1990 | Hakanen ................................ 248/510 |
| 5,016,851 | 5/1991 | Koskinen et al. ..................... 248/278 |
| 5,040,712 | 8/1991 | Pesonen et al. ............... 224/42.45 R |
| 5,121,863 | 6/1992 | Kotitalo et al. ................ 224/42.45 R |
| 5,189,698 | 2/1993 | Hakanen ................................. 379/455 |
| 5,597,102 | 1/1997 | Saarikko et al. ...................... 224/197 |
| 5,598,319 | * 1/1997 | Lee ......................................... 361/684 |
| 5,621,618 | 4/1997 | Komiyama ............................ 361/732 |
| 5,708,707 | 1/1998 | Halttunen et al. .................... 379/446 |
| 5,825,874 | 10/1998 | Humphreys et al. ................. 379/446 |
| 5,828,750 | 10/1998 | Perala ..................................... 379/446 |

FOREIGN PATENT DOCUMENTS

| | | |
|---|---|---|
| 0 545 670 A2 | 6/1993 | (EP) . |
| 0 585 011 A1 | 3/1994 | (EP) . |
| 2 293 718 | 4/1996 | (GB) . |
| WO 95/08847 | 3/1995 | (WO) . |

OTHER PUBLICATIONS

United Kingdom Search Report.

* cited by examiner

Primary Examiner—Brian Sircus
Assistant Examiner—Chandrika Prasad
(74) Attorney, Agent, or Firm—Perman & Green, LLP

(57) ABSTRACT

A deskstand for a radio telephone handset or battery pack therefor, the deskstand having a retention mechanism including pivot members which allow an inserted handset or battery pack to be tilted into a locking position with respect to the deskstand, and to be located in relation to the deskstand.

15 Claims, 5 Drawing Sheets

HOLDER FOR A PORTABLE ELECTRONIC DEVICE

BACKGROUND TO THE INVENTION

In a general sense, the present invention relates to a holder for a portable electronic device. More specifically, the invention has been devised in the context of a so-called deskstand for a radio telephone handset and a battery pack therefor.

A common accessory for a radio telephone handset is a deskstand. A deskstand is designed to serve any one or all of a number functions: It primarily holds the handset or battery pack, usually in an upstanding position, for example simply for storage. It can have electrical connectors for delivering electrical current for recharging a battery pack, the battery pack being either connected to or detached from the handset. It may also provide electronic communication links to and from the radio telephone handset, for example for effecting data transfer.

A deskstand typically consists of a body having a flat base for sitting on a desk top and one or more recesses, or slots, provided in the body for receiving a handset and/or a battery pack. The recesses are dimensioned such that when a handset or battery pack is in situ, the lower region of the handset/battery pack is cradled by the deskstand and the handset/battery pack extends substantially vertically. In the case of a handset, respective sets of electrical connectors, for example in the form of contact pads, or male/female interface connectors, are provided between the handset and the deskstand to effect data transfer to and from an inserted handset; in the case of a battery pack, spring loaded connectors are provided for power charge-up. The typical deskstand, relies on the combination of the frictional fit between the outer surfaces of the handset/battery pack and the walls of the deskstand forming the recess, and gravitational forces acting on the handset/battery (i.e. its weight) to retain the handset/battery in place in the deskstand thereby maintaining the requisite electrical connections.

Certain shortcomings with this way of retaining a handset/battery pack in situ in the deskstand are becoming apparent. With the trend continuing towards ever smaller and lighter handsets—and hence battery packs—the weight of the handset/battery pack in itself is proving to be insufficient for retaining the handset/battery pack in satisfactory electrical communication with the deskstand. This problem is becoming more acute as handsets are being equipped with wide-ranging and complex telecommunication facilities, and the number of data transfer pins is expanding.

One attempt to solve this problem has been to use electrical connectors having relatively high contact spring forces in order to overcome the contact resistance and ensure electrical communication. However, with deskstands becoming smaller along with handsets, there is a limit to the extent of spring contacts that can viably be housed, so this solution is found to be less than satisfactory.

Other solutions have proposed using formations between the deskstand and handset/battery pack to interconnect the two. For example international application published under WO 95/08847 discloses a battery pack retention system for a battery recharging unit consisting of rails provided on opposite side walls of the charger retention area (recess) and corresponding length wise channels formed in the opposite sides of the battery pack. In addition the channels are provided with small compliant 'bumps' which when the battery pack is in situ are flexed inwards and so resiliently push outwards against the rails. Apart from the inherent awkwardness of aligning the rails in relation to the channels when inserting a battery pack, the compliant bumps gradually wear away consequently reducing the effective force which they can exert against the rails. More significantly however is that the disclosed retention system is dependent on the weight of the battery pack to induce sufficient frictional contact force to hold it in place in the retention area.

SUMMARY OF THE INVENTION

Against this background, the present invention resides in a holder for a portable electronic device having a retention mechanism therefor, the retention mechanism comprising complementary formations provided respectively on the holder and the device, pivot members adapted to locate the device with respect to the holder and cooperable to allow pivotting of the device in relation to the holder between an unlocked condition and a locked condition in which the complementary formations interengage.

By allowing the complementary formations to tilt into engagement with one another and effectively wedging the device to the holder, the pivot members ensure that respective electrical contact elements on the device and the holder are positively interconnected. The overall effect achieved is improved retention of the device in the holder and better electrical connections as compared to prior art solutions.

The pivot members may comprise a projection rotatably coupled to a socket. Conveniently, the projection comprises a convex rib and the socket comprises a concave channel, and in a preferred embodiment the convex rib extends from the base of the device and the concave channel is provided in the holder.

Optionally the retention mechanism may include a resiliently biased member arranged to pivot the device from the unlocked condition to the locked condition. It is preferred that the resiliently biased member is arranged to urge against an opposite side of the device to that carrying the formations. In this way, the complementary formations are kept pressed together so that retention of the device in the holder is still firmer. Advantageously, the resiliently biased member acts to guide the device on its insertion in such a manner that the pivot members provided on the device and holder interconnect.

In a preferred embodiment, the resiliently biased member is pivotally mounted with respect to the body and is biased to close a recess opening of the holder in which the device is inserted. This conveniently shuts off the recess opening when the holder is not in use, i.e. when there is no device in situ in the holder. Dust and dirt is thus prevented from entering the recess which protects the electrical connectors. The resiliently biased member also performs an aesthetic role by streamlining the surface of the holder and providing continuity of the styling contours of the holder Additionally, there may be provided resilient means so disposed as to urge the device into the locked condition. In the preferred embodiment the resilient means comprises a spring arm and acts on the base of the device.

In a complementary aspect of the invention, the holder is provided with indicator means which in response to a device being inserted in the holder and electronic communication links being successfully established therebetween, outputs an indication confirming the same. Preferably, the output indication is provided by a light indicator disposed on the holder.

BRIEF DESCRIPTION OF THE DRAWINGS

An embodiment of the invention will now be described by way of example with reference to the accompanying drawings in which.

DETAILED DESCRIPTION OF THE INVENTION

Figure 1:
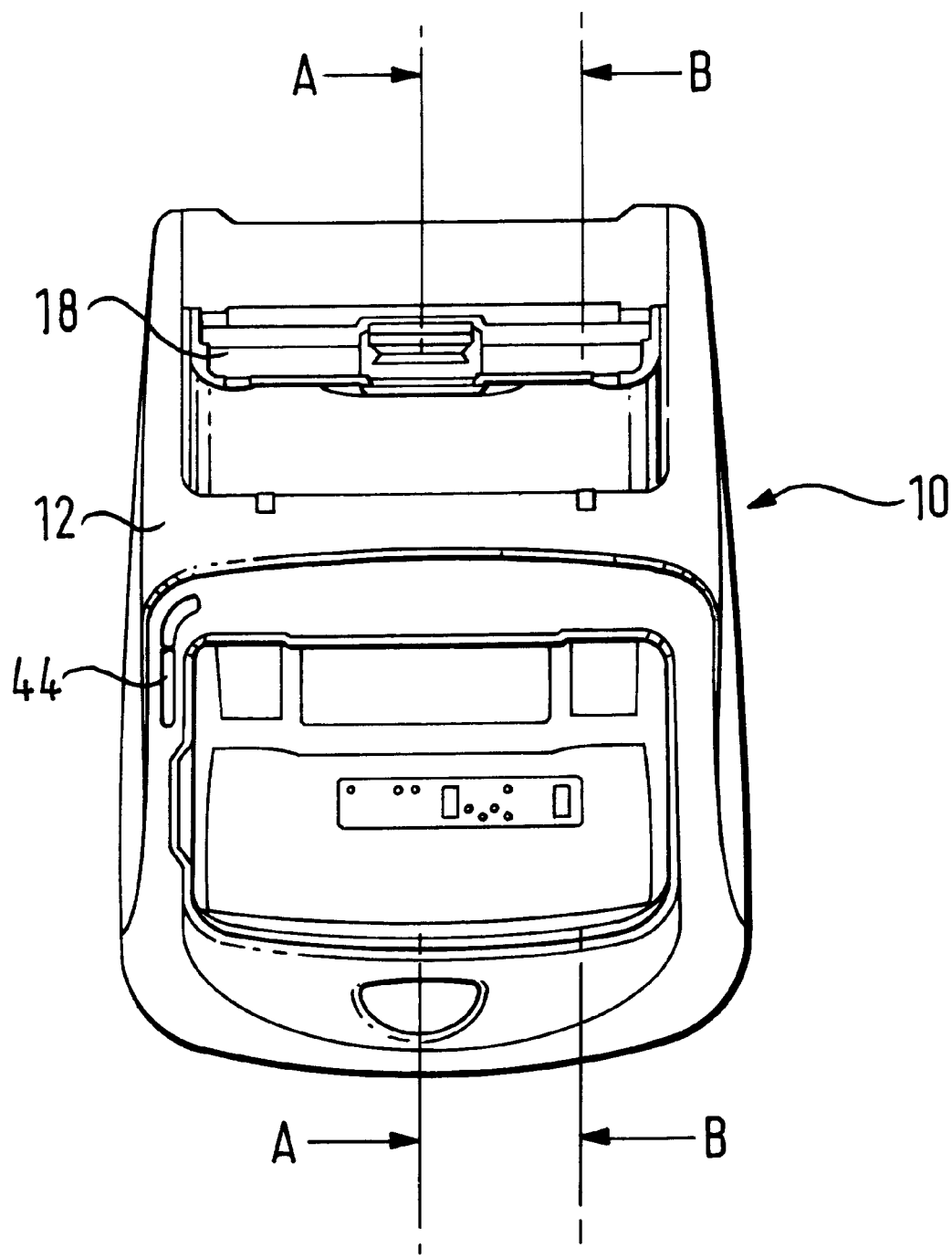
FIG. 1 is a plan view of a preferred embodiment of a holder of the present invention having a portable electronic device in situ.
Figure 4:
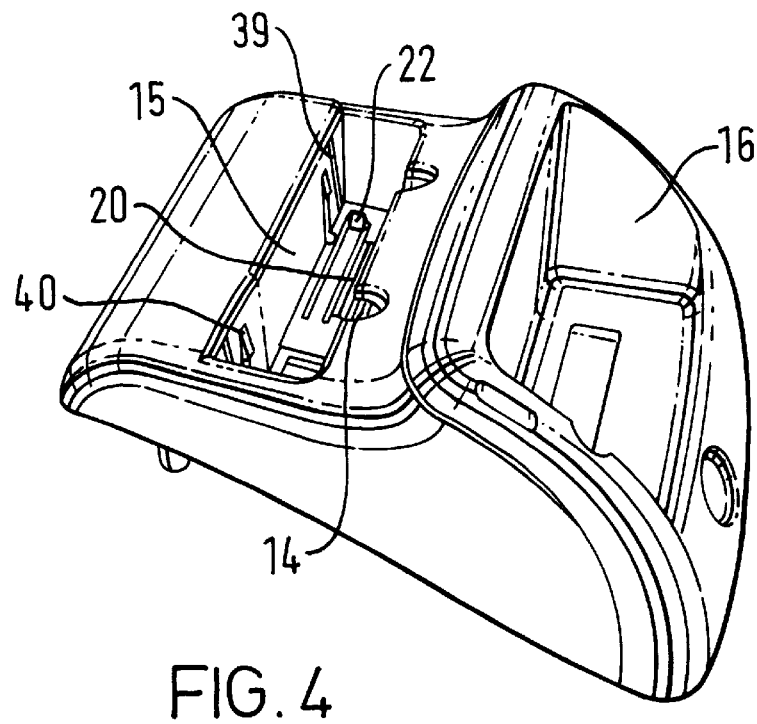
FIG. 4 is a perspective view of an upper cover portion of the preferred embodiment of the holder.

Referring initially to FIGS. 1 and 4, there is shown a holder (although in the case of FIG. 4 that which is shown is simply the upper cover portion of the holder) in the form of a deskstand (10) having a body (12) defining two recesses (14) and (16) shaped respectively to receive a battery pack (18) and a radio telephone handset (not shown).

For economy of description, the retention mechanism which will now be described is confined to the example of a retention mechanism for a battery pack. However, it should be understood that a retention mechanism for the handset itself would have equivalent features.

Figure 2:
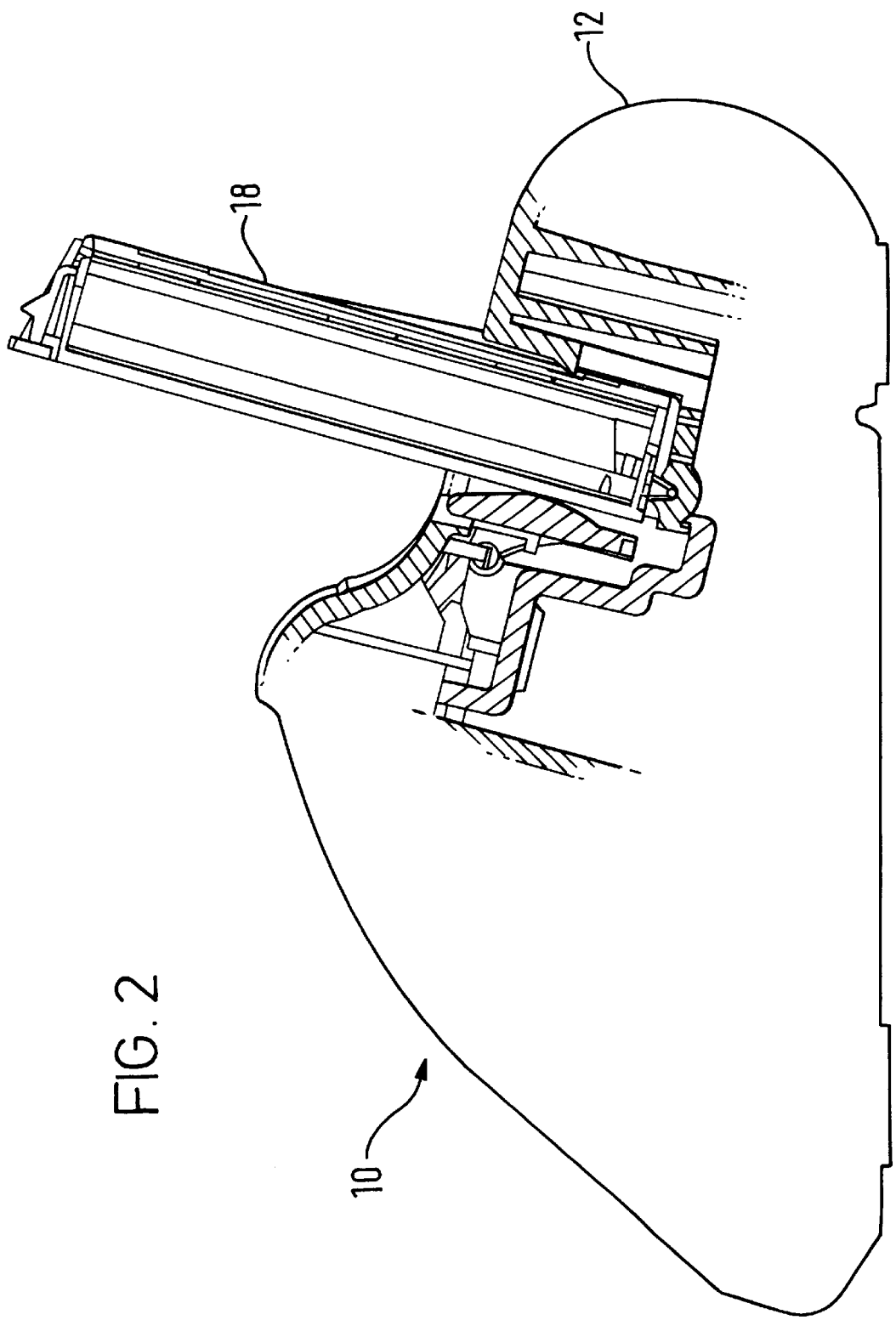
FIG. 2 is a part sectional view on line B—B of FIG. 1.
Figure 3:
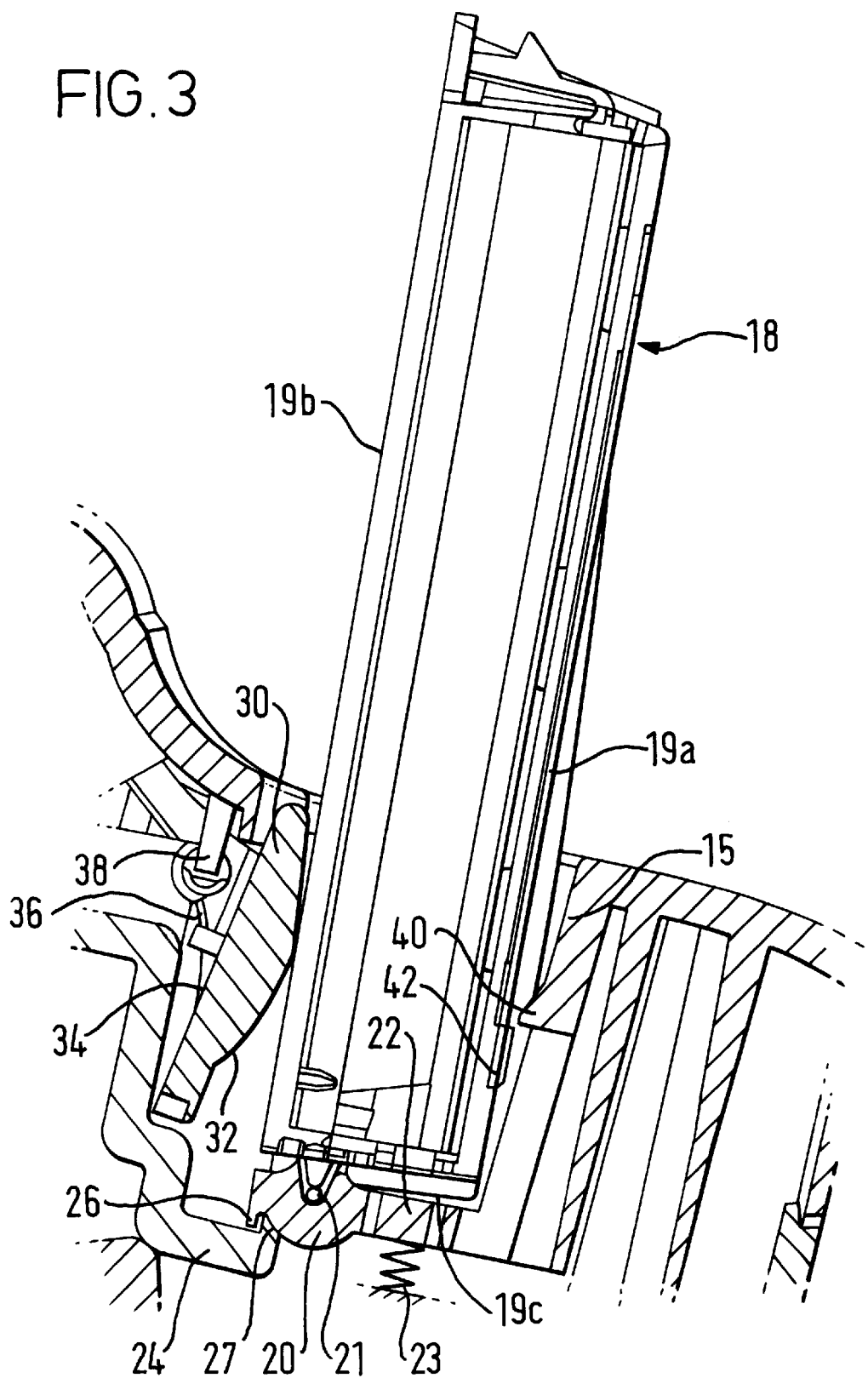
FIG. 3 is an enlarged isolated portion of FIG. 2.

FIG. 2 illustrates a battery pack (18) in an unlocked position in a deskstand (10); in this position the battery pack has been inserted into, or is about to be retracted from, the recess (14) of deskstand (10) and FIG. 3 details the elements making up the battery pack retention mechanism. The mechanism comprises complementary formations (42, 40) provided respectively on the front face (19a) of battery pack casing and a wall (15) of the recess (14) and pivot members (20, 21) disposed at the base of the recess (14). The illustrated retention mechanism also includes a resiliently biased side arm shutter (30) which presses against the rear of the casing (19b) of the battery pack (18), and a spring arm (22) which pushes upwards on the base (19c) of the battery pack (18).

Referring to FIG. 3, the pivot members (20, 21) are adapted to locate the battery pack (18) with respect to the deskstand (10) and are cooperable to allow pivotting of the battery pack (18) in relation to the deskstand. The pivot members consist of a concave channel (20) or groove formed in the base of the recess (14), and a convex rib (21) extending from the base of the battery pack (18). The longitudinal axis of the channel (20)—the pivot axis—is transversly orientated in relation to the direction of insertion of the battery pack (18), and as can be seen from FIG. 6 the channel (20) extends approximately a third of the length of the recess (14). The rib (21) on the battery pack (18) correspondingly extends along the base (19c) of the pack to the same extent as the length of the channel (20). As is apparent from FIG. 3, the rib (21) is received in the channel (20) and is able to rotate with the channel. This combination affords the battery a rotational degree of freedom in the recess (14). In addition, the channel (20) positively locates the battery pack (18) in the recess (14), in other words, with the rib (21) located in the channel (20) the base of the battery is positionally fixed in the recess and is thus not able to slide around from side to side on the base of the recess (14). This also ensures that respective sets of electrical contact pins of the battery pack and the deskstand are correctly aligned in contact.

Figure 6:
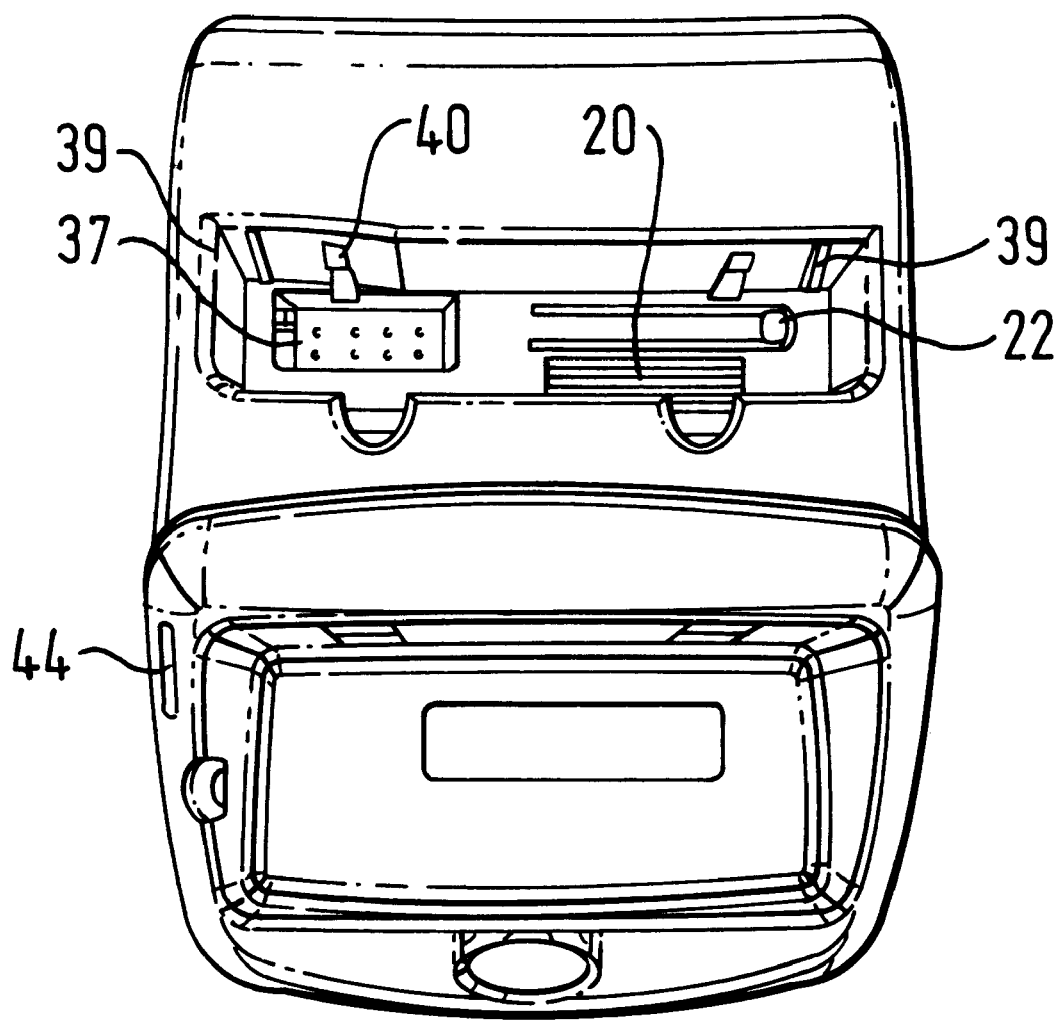
FIG. 6 is a plan view of the holder of FIG. 4.

Disposed adjacent the channel (20) at, or integral with, the base of the recess is the spring arm (22) (see FIGS. 3 and 6).

The spring arm (22) is biased so as to provide an upwards force on the base (19c) of the battery pack (18). In addition, there may be a further spring (23) positioned below the spring arm to provide extra spring force if necessary. FIG. 6 also shows the position of the electrical contact pins (37) in the deskstand. Since, to match up with these the electrical contact pins of the battery are disposed at one end of the battery, the spring arm assists in stabilising the battery pack in a straight position.

Also shown in FIG. 6 are a pair of guide rails, (39) formed in the wall (15) of the recess. Corresponding grooves are provided in the front face (19a) of the battery pack (18). This ensures that the battery pack (18) is inserted in the recess (14) the right way round.

In an alternative embodiment, instead of channel (20) being fixed and the rib (21) rotating in the channel, the channel (20) forms a rocker member which is mounted so as to be pivotally movable with respect to the body (12) of the deskstand (10). In this embodiment, the rocker member has a generally cup-like configuration, with a rounded lower surface which bears against, and pivots relative to, a fixed member (24) of the deskstand body (12). A downward projection (26) of the rocker member engages with an upward lip (27) of the fixed member (24) to limit the degree of pivotting of the rocker member. In this embodiment the rocker member could also be resiliently biased upwards performing the role of the spring arm (22). The hollow of the cup of the rocker member could also accommodate sprung electronic contacts of the deskstand (10).

Turning to the resiliently biased side arm shutter (30), it has a ridged profile (32) on one side and a flat profile (34) on the other. Attached to the flat side of the shutter (30) is one end of a plate spring (36) which is fixed at its other end to a suspended element (38) of the deskstand body (12). The plate spring (36) provides a dual function: it resiliently urges the shutter (30) towards the recess opening whilst rotatably mounting the shutter (30) in relation to the deskstand body (12).

As to the complementary formations, respective sets are provided on the battery pack case (19) and a wall of the recess (15). The formations in the wall of the recess (15) consist of a pair of catches (40) projecting outwards from the wall (15). The catches (40) have a ramped profile and are symmetrically spaced from the centre of the recess. Similarly, the formations in the battery pack casing consist also of a pair of catches (42) projecting outwards from the casing. The position of the catches (42) on the casing is determined so that they correspond to the position of the catches (40) on the recess wall.

The operation of the retention system will now be described with reference to FIGS. 3 and 5.

Figure 5:
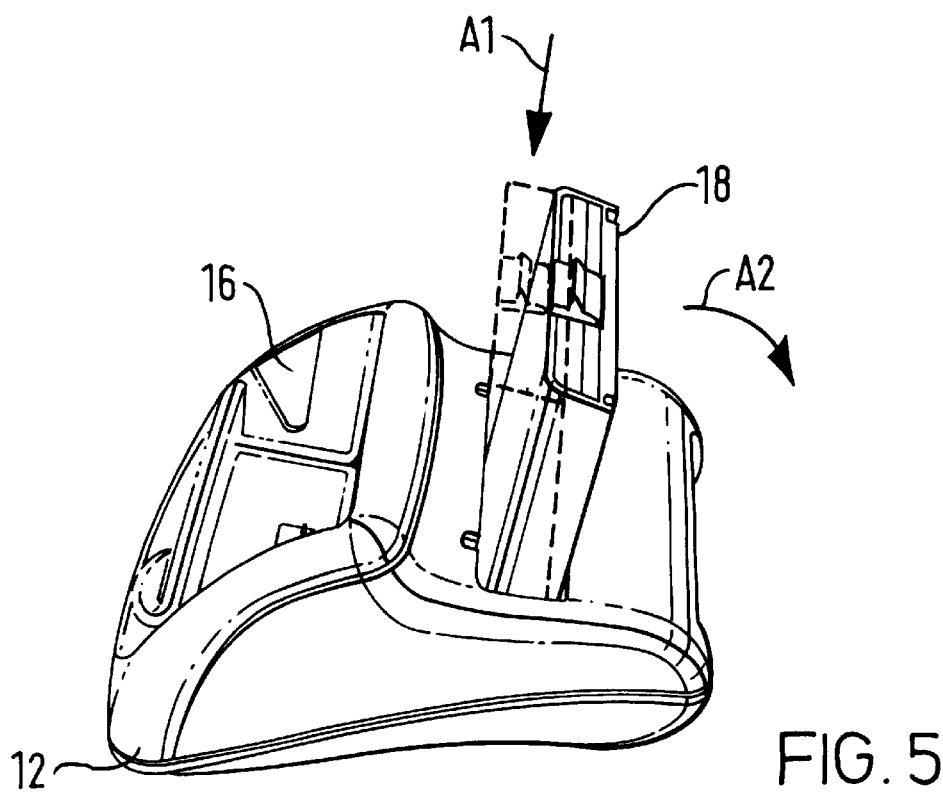
FIG. 5 illustrates a device inserted into a holder of FIGS. 1 to 3.

A battery pack (18), detached from a radio telephone handset and to be recharged, is advanced towards the entrance of the recess (14) as illustrated by arrow A1 in FIG. 5. The base of the battery pack is brought to bear against the ridge of the side arm shutter (30) which normally closes the recess opening, and pushes it down into the recess cavity, the side arm shutter (30) pivotting at point (38) as it does so. As the battery pack (18) is inserted into the recess one face of the battery pack casing slides past and in contact with the ridge of the side arm shutter (30), which being resiliently biased presses against that face of the battery pack (18) and guides its insertion into the recess cavity towards the rocker member (20). On further insertion, the rib (21) of the base of the battery pack plugs into channel (20) in the base of the recess(14). Also the spring arm (22) is flexed backwards and as a result imparts an upwards force on the base (19c) of the battery pack. The position illustrated in FIG. 3, and in broken lines in FIG. 5 is now reached. The battery pack (18) is then tilted in the direction of arrow A2 so that it adopts the configuration shown by the solid lines in FIG. 5. Consequently, the formations of the battery pack (42) and those of the recess wall (40) engage one another, and through the upward spring force of the spring arm (22) latch against and interlock one another.

It should be appreciated that the tilt in the direction arrow A2 can be achieved by either the user or the side arm shutter, or a combination of the two.

To remove the battery pack, the user lightly presses the pack inwards slightly so as to overcome the sprung force of the spring arm, and rocks the pack backwards so that the formations are clear of one another, and then finally retracts the battery pack from the deskstand.

The deskstand can also be provided with a light indicator (44) somewhere on the body of the deskstand so that when respective sets of contacts are successfully connected up the light indicator it switch on and outputting a visual indication confirming the electronic link-up.

The present invention may be embodied in other forms from that described above. Accordingly, reference should be made to the appended claims rather that the foregoing specific description as indicating the scope of invention.

Furthermore, each feature disclosed in this specification and/or shown in the drawings may be incorporated in the invention independently of other disclosed and/or illustrated features.

The abstract as filed herewith is included in the specification by reference.

What is claimed is:

1. A holder for a portable electronic device including a retention mechanism therebetween, the holder having a body defining an opening extending into a cavity for receiving the device, and a shutter rotatably mounted with respect to the body and resiliently biased towards a closed position in which said opening is substantially blocked by the shutter from an open position in which the opening is substantially unblocked by the shutter so as to expose said cavity, the retention mechanism comprising complementary formations provided respectively on the holder and the device, and pivot members adapted to locate the device with respect to the holder and in use cooperating to allow pivoting of the device in relation to the holder between an unlocked condition and a locked condition in which the complementary formations interengage, wherein said shutter is arranged to urge the device about the pivot members from said unlocked condition towards said locked condition.

2. A holder according to claim 1 wherein the pivot members comprise a projection rotatably coupled to a socket.

3. A holder according to claim 2 wherein the projection comprises a convex rib and the socket comprises a concave channel.

4. A holder according to claim 3 wherein the convex rib extends from the base of the device and the concave channel is provided in the holder.

5. A holder according to claim 1 wherein the pivot members comprise a rocker member pivotally mounted with respect to the holder and adapted to receive a projection extending from the device.

6. A holder according to claim 1, wherein said shutter acts on an opposite face of the device to that carrying a formation of said retention mechanism.

7. A holder according to claim 1, wherein said shutter acts to guide the device on insertion into said opening in such a manner that the pivot members are caused to interconnect.

8. A holder according to claim 1 comprising further resilient means so disposed as to urge the device into the locked condition.

9. A holder according to claim 8 wherein the resilient means acts on the base of the device.

10. A holder according to claim 8 wherein the resilient means comprises a spring arm.

11. A portable electronic device as in any one of the preceding claims having formations for a retention mechanism adapted for use in said holder.

12. A portable electronic device of claim 11, wherein said device is a rechargeable battery pack.

13. A portable electronic device of claim 11, wherein said device is a mobile phone.

14. A holder for a portable electronic device, said holder including an opening for receiving said device and a rotatably mounted shutter resiliently biased towards a closed position in which said opening is blocked by said shutter, said holder including a retention mechanism, positioned between said holder and said device, the retention mechanism comprising complementary formations provided respectively on said holder and said device, and pivot members adapted to locate said device and cooperating to allow pivoting of said device in relation to the holder between an unlocked condition and a locked condition in which the complementary formations interengage, whereby said shutter is arranged to urge said device about said pivot members from said unlocked condition towards said locked condition.

15. A holder for a portable electronic device, said holder including an opening for receiving said device and a rotatably mounted shutter resiliently biased towards a closed position in which said opening is blocked by said shutter, said holder including a retention mechanism, positioned between said holder and said device, the retention mechanism comprising complementary formations provided respectively on said holder and said device and pivot members adapted to locate said device and cooperating to allow pivoting of said device in relation to the holder between an unlocked condition and a locked condition in which the complementary formations interengage, whereby said shutter is arranged to urge said device about said pivot members from said unlocked condition towards said locked condition, said shutter guiding said device on insertion into said opening whereby said pivot members interconnect.

\* \* \* \* \*